US011869067B2

(12) United States Patent
Peddinti et al.

(10) Patent No.: US 11,869,067 B2
(45) Date of Patent: *Jan. 9, 2024

(54) GUIDED PURCHASING VIA SMARTPHONE

(71) Applicant: Google LLC, Mountain View, CA (US)

(72) Inventors: Raghava Viswa Mani Kiran Peddinti, Sunnyvale, CA (US); Lakshmi Kumar Dabbiru, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/306,128

(22) Filed: May 3, 2021

(65) Prior Publication Data

US 2021/0256595 A1 Aug. 19, 2021

Related U.S. Application Data

(63) Continuation of application No. 15/812,459, filed on Nov. 14, 2017, now Pat. No. 11,023,956, which is a
(Continued)

(51) Int. Cl.
*G06Q 30/00* (2023.01)
*G06Q 30/0601* (2023.01)
(Continued)

(52) U.S. Cl.
CPC ..... *G06Q 30/0635* (2013.01); *G06Q 30/0267* (2013.01); *G06Q 30/0275* (2013.01)

(58) Field of Classification Search
None
See application file for complete search history.

(56) References Cited

U.S. PATENT DOCUMENTS 5,537,618 A * 7/1996 Boulton ................ G09B 7/04
434/118
5,970,475 A * 10/1999 Barnes ................ G06Q 20/023
340/5.8
(Continued)

FOREIGN PATENT DOCUMENTS

JP 2005049946 2/2005
JP 2005049946 A * 2/2005 ............. G06F 17/60
(Continued)

OTHER PUBLICATIONS

Verified by Visa: Acquirer and Merchant Implementation Guide. (U.S. Region May 2011). https://usa.visa.com/dam/VCOM/download/merchants/verified-by-visa-acquirer-merchant-implementation-guide.pdf. Retrieved online Aug. 7, 2017. (Year: 2011).*
(Continued)

*Primary Examiner* — James A Reagan
(74) *Attorney, Agent, or Firm* — Fish & Richardson P.C.

(57) ABSTRACT

Guiding purchasing via smartphone by, determining, via smartphone input of a user, the smartphone user's intent to purchase a given product. At least one sequence of tasks to purchase each of a plurality of products is determined. The determined intent to purchase the given product is associated with a determined sequence of tasks to purchase one of the products in the plurality of products. The smartphone user's current state in the associated sequence of tasks is determined. The smartphone user is notified, via the smartphone, of the next uncompleted task from the associated sequence of tasks based on the smartphone user's current state in the associated sequence of tasks.

20 Claims, 9 Drawing Sheets

Related U.S. Application Data continuation of application No. 14/855,363, filed on Sep. 15, 2015, now Pat. No. 9,842,365.

(51) Int. Cl.
  *G06Q 30/0251* (2023.01)
  *G06Q 30/0273* (2023.01)

(56) References Cited

U.S. PATENT DOCUMENTS

| | | | |
|---|---|---|---|
| 7,930,302 B2 * | 4/2011 | Bandaru | G06F 16/951 715/810 |
| 8,100,322 B1 * | 1/2012 | Nachenburg | G06Q 30/0203 707/758 |
| 8,860,587 B2 | 10/2014 | Nordstrom | |
| 9,799,035 B2 * | 10/2017 | Cama | G06Q 30/02 |
| 9,842,365 B2 * | 12/2017 | Peddinti | G06Q 30/0635 |
| 2001/0041988 A1 * | 11/2001 | Lin | G06Q 30/0601 705/26.1 |
| 2002/0054130 A1 * | 5/2002 | Abbott, III | G06Q 10/109 715/783 |
| 2002/0116266 A1 * | 8/2002 | Marshall | G06Q 10/10 705/14.14 |
| 2003/0083961 A1 * | 5/2003 | Bezos | G06Q 30/02 705/26.8 |
| 2004/0019530 A1 | 1/2004 | Broussard et al. | |
| 2006/0089843 A1 * | 4/2006 | Flather | G06Q 30/06 705/1.1 |
| 2006/0245622 A1 * | 11/2006 | Tedesco | G08B 13/196 382/115 |
| 2006/0248027 A1 * | 11/2006 | Tedesco | G08B 13/196 706/14 |
| 2006/0248028 A1 * | 11/2006 | Tedesco | G06V 20/00 706/14 |
| 2007/0214000 A1 * | 9/2007 | Shahrabi | G06Q 30/0269 705/347 |
| 2010/0049590 A1 * | 2/2010 | Anshul | G06Q 30/02 706/54 |
| 2010/0332301 A1 * | 12/2010 | Higgins | G06Q 30/0217 705/14.69 |
| 2010/0332304 A1 * | 12/2010 | Higgins | G06Q 30/02 705/14.19 |
| 2011/0078018 A1 * | 3/2011 | Chunilal | G06F 17/30867 705/14.48 |
| 2011/0182283 A1 * | 7/2011 | Van Buren | H04W 4/14 704/270.1 |
| 2011/0276406 A1 * | 11/2011 | Sneyders | G06Q 30/02 705/26.1 |
| 2012/0022943 A1 | 1/2012 | Howard et al. | |
| 2012/0084120 A1 * | 4/2012 | Hirsch | G06Q 30/02 705/7.32 |
| 2013/0066675 A1 * | 3/2013 | Bercaw | G06Q 30/0201 705/7.29 |
| 2013/0185154 A1 * | 7/2013 | Mathew | G06Q 30/0255 705/14.53 |
| 2013/0191213 A1 * | 7/2013 | Beck | G06Q 30/0207 705/14.53 |
| 2013/0346209 A1 * | 12/2013 | Longhenry | G06Q 30/0267 705/14.64 |
| 2014/0025465 A1 * | 1/2014 | Herring | G06Q 30/02 705/14.25 |
| 2015/0032532 A1 * | 1/2015 | Narasimhan | G06Q 30/0239 705/14.5 |
| 2015/0088608 A1 * | 3/2015 | Cama | G06Q 30/02 705/7.32 |
| 2015/0088635 A1 * | 3/2015 | Maycotte | G06Q 30/0244 705/14.43 |
| 2015/0095111 A1 * | 4/2015 | Tang | G06Q 30/0202 705/7.31 |
| 2015/0227890 A1 * | 8/2015 | Bednarek | G06Q 30/0635 705/26.81 |
| 2015/0227949 A1 * | 8/2015 | Sangani | H04W 4/029 705/7.29 |
| 2016/0012465 A1 * | 1/2016 | Sharp | G06Q 20/18 705/14.17 |
| 2017/0076357 A1 * | 3/2017 | Peddinti | G06Q 30/0275 |

FOREIGN PATENT DOCUMENTS

| | | | | |
|---|---|---|---|---|
| WO | WO 2006049414 | | 5/2006 | |
| WO | WO-2006049414 A1 | * | 5/2006 | ............. G06Q 30/06 |
| WO | WO 2009050529 | | 4/2009 | |
| WO | WO-2009050529 A2 | * | 4/2009 | ............. G06Q 30/02 |

OTHER PUBLICATIONS

Jiang et al. Customer intention to return online: price perception, attribute-level performance, and satisfaction unfolding over time. (Jun. 15, 2004). Retrieved online Jan. 27, 2021. https://citeseerx.ist.psu.edu/viewdoc/download?doi=10.1.1.623.9018&rep=rep1&type=pdf (Year: 2004).*

Curtis, Tamilla. Customer Satisfaction, Loyalty, and Repurchase: Meta-Analytical Review, and Theoretical and Empirical Evidence of Loyalty and Repurchase Differences. (2009). Retrieved online Jan. 27, 2021. https://core.ac.uk/download/pdf/51097666.pdf (Year: 2009).*

Curtis, Tannilla. Customer Satisfaction, Loyalty, and Repurchase: Meta-Analytical Review, and Theoretical and Empirical Evidence of Loyalty and Repurchase Differences. (2009). Retrieved online Jan. 27, 2021. https://core.ac.uk/download/pdf/51097666.pdf (Year: 2009).

Jiang et al. Customer intention to return online: price perception, attribute-level performance, and satisfaction unfolding over time. (Jun. 15, 2004). Retrieved online Jan. 27, 2021. https://citeseerx.ist.psu.edu/viewdoc/download?doi=10.1.1.623.9018&rep=rep1&type=pdf (Year: 2004).

Verified by Visa: Acquirer and Merchant Implementation Guide. (U.S. Region May 2011). https://usa.visa.conn/dannNCOM/download/nnerchants/verified-by-visa-acquirer-nnerchant-innplementation-guide.pdf. Retrieved online Aug. 7, 2017. (Year: 2011).

* cited by examiner

300

400

500

600

GUIDED PURCHASING VIA SMARTPHONE

CROSS REFERENCE TO RELATED APPLICATION

This application is a continuation of U.S. application Ser. No. 15/812,459, filed Nov. 14, 2017, which is a continuation of U.S. application Ser. No. 14/855,363, filed Sep. 15, 2015, the contents of each are incorporated by reference herein.

TECHNICAL FIELD

The present disclosure relates to guiding the online purchase of goods and services (hereinafter "products") via the limited user interface ("UI") offered by a typical smartphone, and in the fragmented interactions characteristic of increasingly typical smartphone use.

BACKGROUND

Online shopping is a form of electronic commerce that allows consumers to buy products from sellers over the Internet-typically using a browser on the World Wide Web, but also via native shopping applications. Worldwide online shopping sales volume for 2012 exceeded a trillion dollars.

A smartphone is a mobile phone with an operating system that combines features of a personal computer and other features useful for mobile or handheld use. Smartphones typically provide the functionality of a cell phone, such as personal digital assistant (PDA), a media player, a camera, and a Global Positioning System (GPS)-based navigation device. Most smartphones are equipped to access the Internet and have a touchscreen user interface. Some smartphones include mobile payment functionality. In 2014, smartphone sales worldwide topped 1.2 billion units. Several sources expect that search engine queries from mobile devices, such as smartphones and tablet computers, will surpass search engine queries from larger devices, such as laptops, and non-mobile devices, such as desktop computers in the near future.

As smartphones and tablet computers have become an indispensable part of the life of many consumers, what used to be predictable daily sessions online, for example, at a desktop computer, have been supplemented, if not replaced, by fragmented interactions using smaller interfaces existing on smartphones and smaller tablet computing devices. Many of these moments occur every day, for example, checking the time, texting a spouse, chatting with friends on social media. Relevant to the present technology, some of these fragmented interactions, referred to by some as "micro moments," are "I want to buy" moments.

SUMMARY

Embodiments of the technology disclosed herein provide systems, methods, and computer program products for guiding purchase activities via a smartphone. In such methods, the smartphone user's intent to purchase a given product is determined via smartphone input of a user. At least one sequence of tasks to purchase each of a plurality of products is determined. The determined intent to purchase the given product is associated with a determined sequence of tasks to purchase one of the products in the plurality of products. The smartphone user's current state in the associated sequence of tasks is determined. The smartphone user is notified, via the smartphone, of the next uncompleted task from the associated sequence of tasks based on the smartphone user's current state in the associated sequence of tasks.

In some embodiments, an indication that a task in the associated sequence of tasks is complete is received via the smartphone. The smartphone user's current state in the associated sequence of tasks is updated, and the smartphone user is notified, via the smartphone, of the next uncompleted task from the associated sequence of tasks based on the smartphone user's updated state in the associated sequence of tasks.

In some embodiments, advertising bids are received, each bid comprising an advertisement, and each bid expressed as a function of 1) the advertised product, and 2) a task in one or more determined sequences of tasks for purchasing the advertised product. In such embodiments, at least one received advertising bid is selected based on 1) the smartphone user's intent to purchase the advertised product, 2) the determined sequence of tasks for purchasing the advertised product, and 3) the smartphone user's task state. In such embodiments, notifying the smartphone user includes transmitting, to the user's smartphone for display, the advertisement of the selected advertising bid.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Technical impediments exist to consumers conducting online shopping on a smartphone. In 2014, the average new smartphone presented a diagonal screen size of less than 5"—including the space available for a keyboard. With such a limited UI, entering long queries and conducting extensive research on a smartphone can be cumbersome for the consumer. Such a small user interface is not amenable to displaying rich results, for example search results responsive to broad queries. When combined with the growing fragmented nature of consumers' interaction with smartphones, the technical challenge to presenting useful information across fragmented interactions through a relatively small UI can be substantial.

Further, in such an environment, impediments exist to selling smartphone ad opportunities to advertisers. The typical breadth of each query and the increasingly fragmented nature of a typical consumer's interaction with his or her smartphone makes it a challenge to identify relevant information to present to the relevant audience, and then to present that information via a limited UI.

Overview

Embodiments of the present technology can start with an expression of intent to purchase on the part of a consumer, and guide the consumer through a sequence of tasks known to facilitate the purchase process in a fashion that accounts for both the fragmented nature of typical user interaction with a smartphone and the limitations of the typical smartphone UI. Embodiments of the present technology also can leverage the consumer's interaction with the purchase process to provide more focused information on which advertisers can base bids for smartphone advertising opportunities.

By using and relying on the technology described herein, the limited UI space of a smartphone can be used to display relevant information during the short time spans characteristic of fragmented smartphone use. As such, the systems and methods described herein may be employed to leverage micro moments over time. Further, even sporadic fragmentary consumer interaction through the smartphone's limited UI can be used to enable advertisers to focus advertisement bids on more relevant consumers.

Turning now to the drawings, in which like numerals indicate like (but not necessarily identical) elements throughout the figures, example embodiments are described in detail.

Example Architectures

Figure 1:
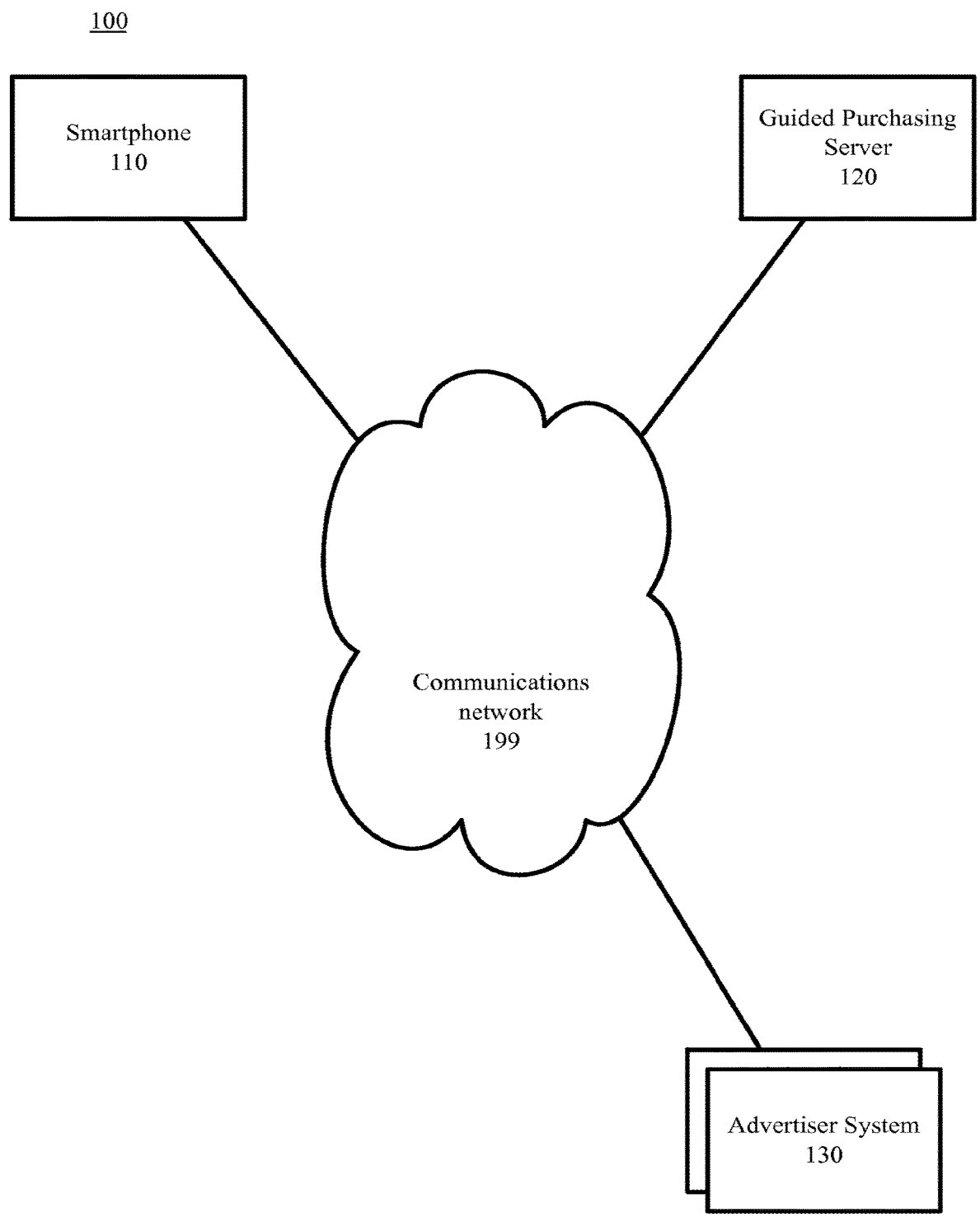
FIG. 1 is a block diagram depicting a communications and processing architecture for guiding purchase activities using a smartphone, in accordance with certain example embodiments.

FIG. 1 is a block diagram depicting a communications and processing architecture 100 for guiding purchasing via a smartphone, in accordance with certain example embodiments. While some servers, systems, and devices shown in the architecture are represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network computing devices 110, 120, and 130; each of which may be configured to communicate with one another via communications network 199. In some embodiments, a user associated with a device must install an application and/or make a feature selection to obtain the benefits of the technology described herein.

Network 199 includes one or more wired or wireless telecommunications means by which network devices may exchange data. For example, the network 199 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, and 130 can include a communication module capable of transmitting and receiving data over the network 199. For example, each network device 120 and 130 can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. Network device 110 is a smartphone. In the example embodiment depicted in FIG. 1, a smartphone user may operate smartphone 110, a guided purchasing server operator may operate guided purchasing server 120, and an advertiser may operate advertiser system 130.

Figure 5:
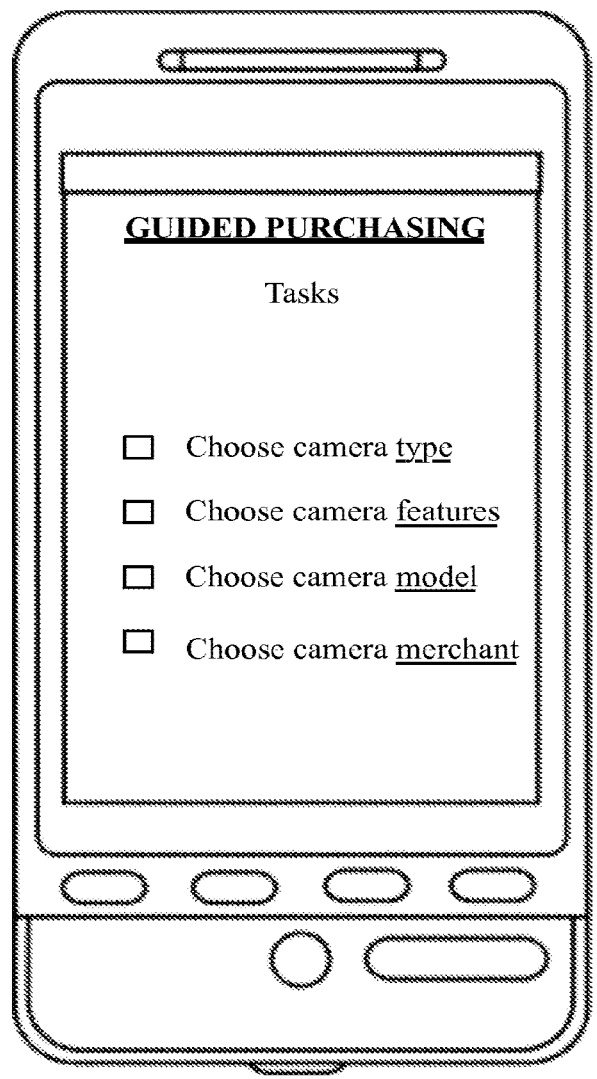
FIG. 5 is a diagram depicting a notional user interface for communicating determined tasks using a smartphone, in accordance with certain example embodiments.

In example embodiments, the network devices, and any other computing machines associated with the technology presented herein, may be any type of computing machine such as, but not limited to, those discussed in more detail with respect to FIG. 5. Furthermore, any modules associated with any of these computing machines, such as modules described herein or any other modules (scripts, web content, software, firmware, or hardware) associated with the technology presented herein may by any of the modules discussed in more detail with respect to FIG. 5. The computing machines discussed herein may communicate with one another as well as other computing machines or communication systems over one or more networks, such as communications network 199. The communications network 199 may include any type of data or communications network, including any of the network technology discussed with respect to FIG. 5.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations.

Example Processes

The example methods illustrated in figures are described hereinafter with respect to the components of the example communications and processing architecture 100. The example methods can also be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
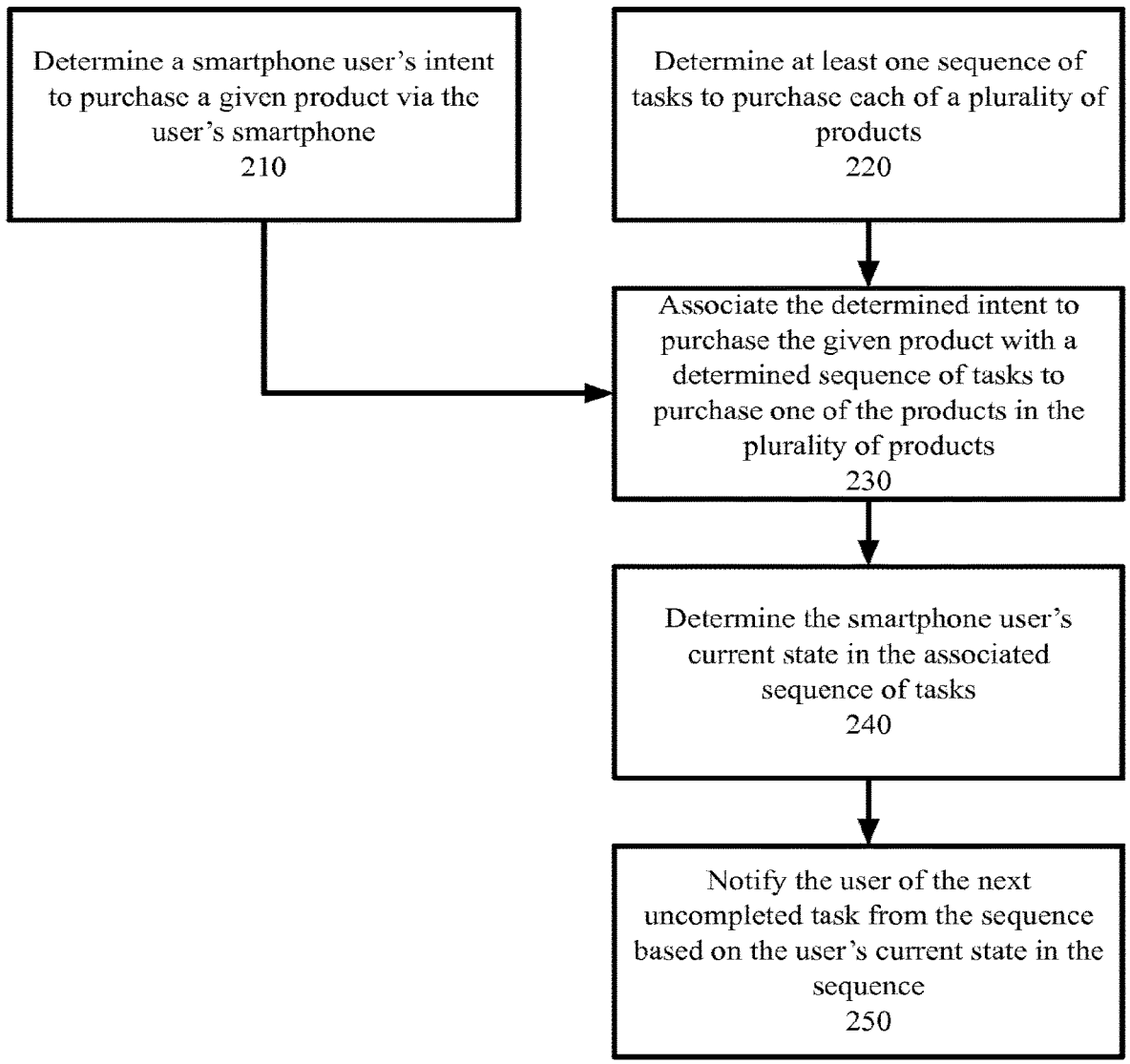
FIG. 2 is a block diagram depicting guiding purchase activities using a smartphone, in accordance with certain example embodiments.
Figure 3:
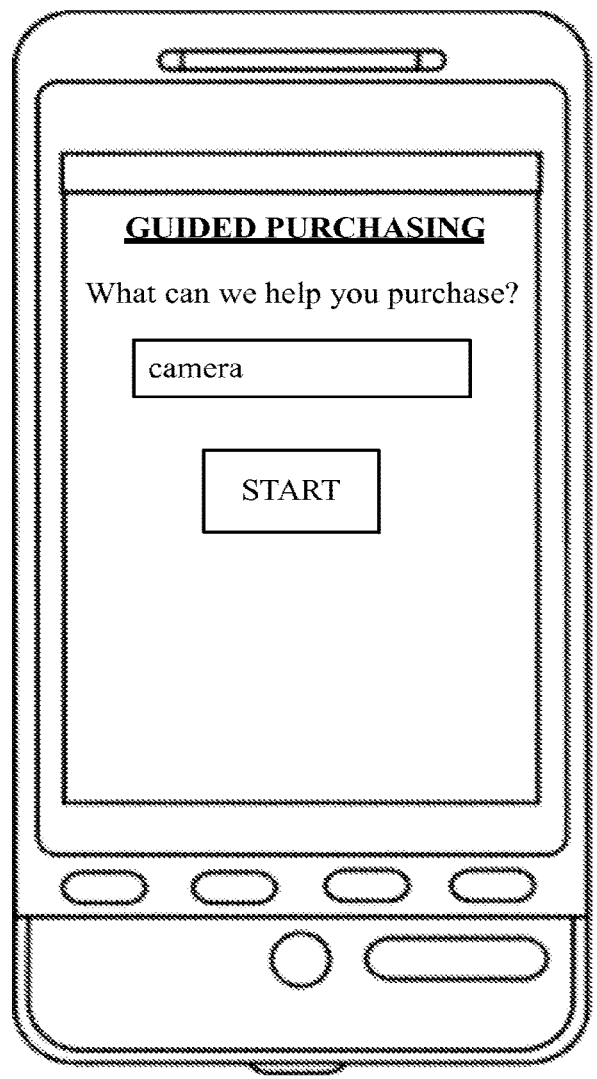
FIG. 3 is a diagram depicting a notional user interface for determining guided purchasing intent using a smartphone, in accordance with certain example embodiments.

Referring to FIG. 2, a block flow diagram depicting methods 200 for guiding purchase activities using a smartphone, in accordance with certain example embodiments, is shown. In such methods, one or more computing devices can determine a smartphone user's intent to purchase a given product via the user's smartphone-Block 210. Consider, as a continuing example, a user explicitly expressing intent to purchase a camera via the user's smartphone 110 to the guided purchasing server 120. FIG. 3 is a diagram depicting a notional user interface for determining guided purchasing intent using smartphone, in accordance with the continuing example.

In some embodiments of the present technology, a user's intent can be determined in other fashions, for example, 1) by the guided purchasing server 120 querying the user, via the user's smartphone 110, after observing the user's interest in social media pages featuring a product, or 2) by the guided purchasing server 120 receiving selection of an "intent to purchase" (or similarly labeled) radio button via the UI of the smartphone 110.

One or more computing devices can determine at least one sequence of tasks to purchase each of a plurality of products-Block 220. For example, user search logs/task logs can be examined to identify at least one sequence of tasks that go into purchasing each of a wide variety of products. A guided purchasing server 120, using a machine learning algorithm to interpret user browser history across a population of users, can show that online camera purchasers typically engage in one of several task sequences. For example, many online camera purchasers choose the type of camera (for example digital single lens reflex (DSLR), digital point-and-shoot, film SLR, instant film), choose camera features (for example, film speed, zoom, and other features that may depend on camera type), and choose a merchant. While these tasks can be performed in most any order, and can be performed iteratively, the machine learning algorithm can use information such as post-purchase consumer satisfaction with the purchase process as a way to derive a recommended order. In some embodiments, the guided purchasing server 120 can determine tasks that a typical user can be expected to complete in a short amount of time in the limited interface typical of a smartphone.

In the continuing example, the guided purchasing server 120 determines a plurality of task sequences for buying a camera well before the user's intent to by a camera is expressed via the user's smartphone 110. One of those sequences (hereinafter "S1") is as follows: choose a camera type from among {DSLR, SLR, instant film, digital point-and-shoot}, choose camera features of the chosen camera type, choose at least one camera model from among the cameras of the chosen type having the chosen features, and choose a merchant carrying a camera model of the chosen type having the chosen features.

In further examples, human operators can curate task identification and sequencing. In some embodiments, rich task sequences including at least one conditional task conditioned on at least one of user input and user task state can be determined.

The one or more computing devices can associate the determined intent to purchase the given product with a determined sequence of tasks to purchase one of the products in the plurality of products-Block 230. In the continuing example, the guided purchasing server 120 associates the user's intent to purchase a camera, as determined via the user's smartphone 110, with the sequence S1.

In some embodiments, association of the user's intent to purchase a given product with a determined task sequence can depend on the results of interactive feedback between the present technology and the user. For example, the guided purchasing server 120 can query the user, via the user's smartphone 110, regarding a purchase budget, as shown in the notional user interface 400 of FIG. 4. The purchase budget can then be used to determine one task sequence, from among a plurality of task sequences based on the user's response to the budget query. FIG. 5 is a diagram depicting a notional user interface 500 for communicating determined tasks using a smartphone, in accordance with certain example embodiments.

In some embodiments, the intent to purchase is characterized by a deadline. In such embodiments, selection of a task sequence is based on the deadline, for example, only task sequences that can reasonably be completed by the deadline are considered for association with the intent to purchase. In some embodiments where intent to purchase is characterized by a deadline, all task sequences are considered and the time for each task is proportionally fitted to the deadline. For example, each task in the associated sequence of tasks can be characterized by a time allocation as a percentage of the overall sequence. In such embodiments, notifying the smartphone user of the next uncompleted task includes notifying the user of a deadline to complete the next uncompleted task as a function of the percentage of time along the critical path of the sequence of tasks allocated to the next uncompleted task. In some embodiments, the guided purchasing server 120 receives schedule objectives, such as final and interim deadlines, from the user, via smartphone 110.

The one or more computing devices can determine the smartphone user's current state in the associated sequence of tasks-Block 240. In the continuing example, the guided purchasing server 120 determines that the user, while expressing intent to purchase a camera, has not expressed a choice regarding camera type, features, model, and merchant-leaving each task in S1 uncompleted.

In a different example, if the user had expressed intent to purchase a DSLR camera, the guided purchasing server 120 would still select the S1 sequence of tasks, but would determine the user's state to include having completed the first task in the S1 sequence of tasks. In some embodiments, the user's state in the associated sequence of tasks can include other context characteristics of both the user and the user's smartphone 110. For example, the smartphone 110 location can be an element of the user's task state, influencing the list of nearby merchants available to present to the user.

Figure 6:
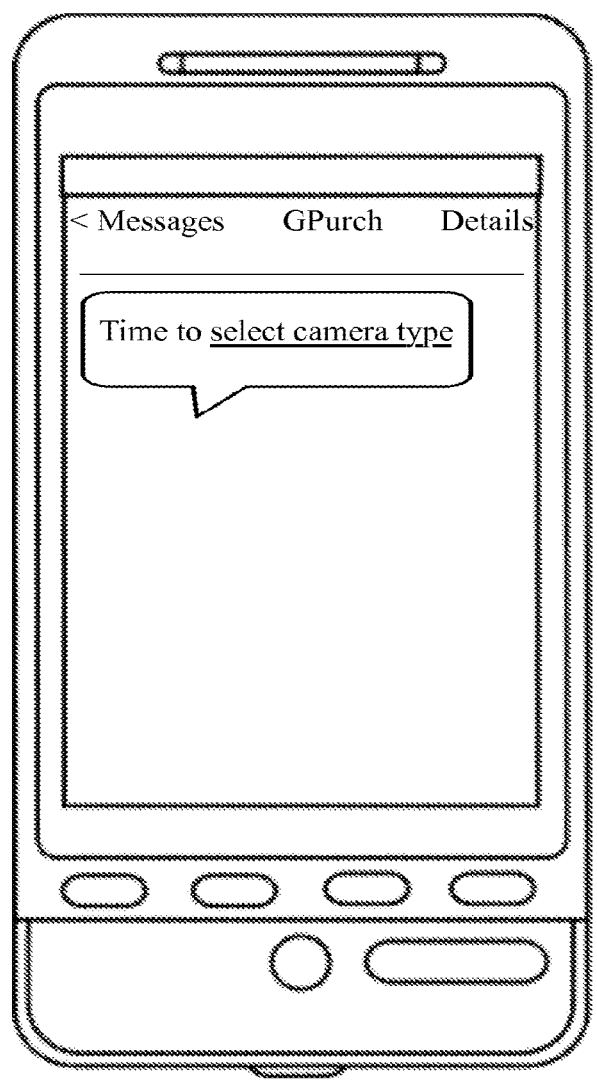
FIG. 6 is a diagram depicting a notional user interface for reminding a user of tasks using a smartphone, in accordance with certain example embodiments.

The one or more computing devices can notify the smartphone user of the next uncompleted task from the associated sequence of tasks based on the smartphone user's current state in the associated sequence of tasks-Block 250. In the continuing example, the guided purchasing server 120 sends a Short Message Service (SMS) text message to the user's smartphone 110 to choose a camera type from among {DSLR, SLR, instant film, and digital point-and-shoot}. FIG. 6 is a diagram depicting a notional user interface for reminding a user of tasks using a smartphone, in accordance with certain example embodiments.

In other examples, more than one task can be the next uncompleted task in the associated sequence of tasks, and the guided purchasing server 120 can notify the user of one or both of the next uncompleted tasks. In some embodiments, the guided purchasing server 120 can send one or more subsequent notifications to the user's smartphone 110 if the guided purchasing server 120 has not received an indication of task completion. Such notifications can be periodic, regular, or combined across a plurality of concurrent purchasing objectives. In some embodiments, the guided purchasing server 120 also can provide information associated with completing the task (for example, an explanation of the meaning of each camera type along with advantages and disadvantages of each type). The guided information server 120 can provide such information either directly, or through a hyperlink to its own content or to third party content.

Referring to FIG. 3, and continuing to refer to prior figures for context, a block diagram 300 depicting methods for guiding purchase activities using a smartphone, in accordance with certain example embodiments is shown. In such embodiments, Block 210-250 can be performed as described in connection with FIG. 2. In such embodiments, the one or more computing devices receive an indication that a task in the associated sequence of tasks is complete-Block 360. In the continuing example, the guided purchasing server 120 receives an indication from the user's smartphone 110 that the user has selected the DSLR camera type.

The one or more computing devices can update the smartphone user's current state in the associated sequence of tasks-Block 370. In the continuing example, the guided purchasing server 120 can update the smartphone user's status in S1 to reflect that the DSLR camera type has been chosen.

If there are remaining uncompleted tasks ("Yes" path from Block 380), then the one or more computing devices determines the smartphone user's current state in the associated sequence of tasks as described above (Block 240), and then notifies the smartphone user of the next uncompleted task from the associated sequence of tasks, based on the smartphone user's updated state in the associated sequence of tasks-Block 250. In the continuing example, the guided purchasing server 120 determines that tasks remain in the S1 task sequence, determines that the user has yet to complete the "choose camera features" task, the "review camera accessories" task, and the "choose a merchant" tasks in S1. The guided purchasing server 120 then notifies the user, via the user's smartphone 110, to "choose camera features," which is the next task in S1.

In the continuing example, the guided purchasing server 120, in cooperation with the user, via the smartphone 110, loops through each of the remaining tasks in S1, allowing the user to select camera feature set A for DSLR cameras, camera models Mod1 and Mod2 from among DSLR cameras having feature set A; and merchants MerchX and MerchY from among merchant carrying DSLR cameras of Mod1 and Mod2 with feature set A.

The guided purchasing server 120 then receives a selection of the Mod2 camera for purchase from MerchY by the user via the user's smartphone 110. In cooperation with MerchY's online sales portal, the guided purchasing server 120 allows the user to complete the purchase of Mod2 camera from MerchY by the user via the user's smartphone 110.

Figure 4:
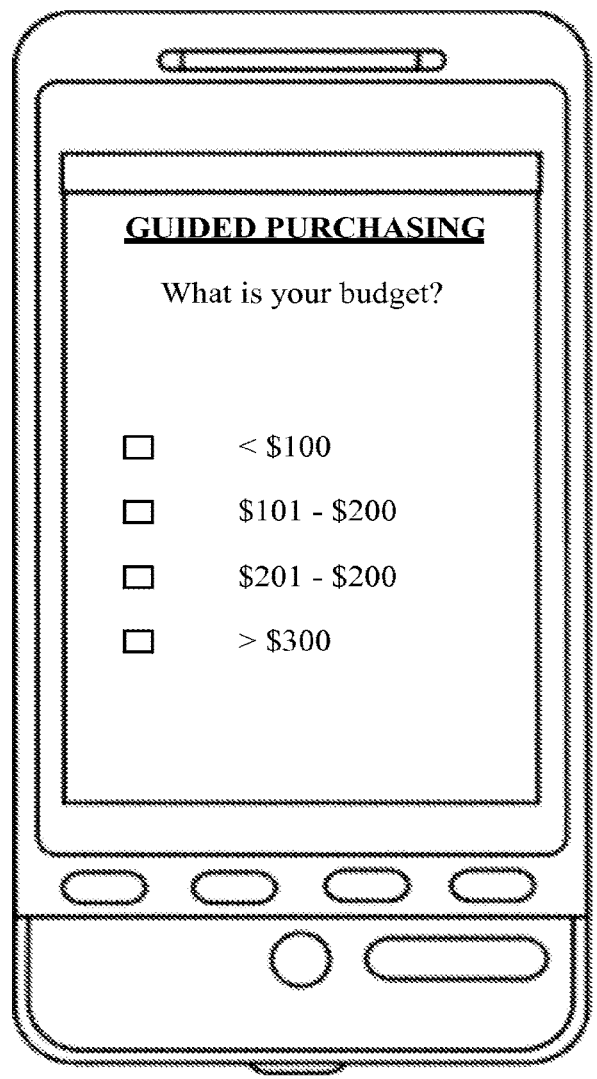
FIG. 4 is a diagram depicting a notional user interface for determining a guided purchasing user's budget using a smartphone, in accordance with certain example embodiments.

Referring to FIG. 4, and continuing to refer to prior figures for context, a block diagram 400 depicting methods for guiding purchase activities using a smartphone, in accordance with certain example embodiments is shown. In such embodiments, Block 210-Block 240 are performed as described in connection with FIG. 2. In such embodiments, one or more computing devices receive a plurality of advertising bids-Block 460. Each bid includes an advertisement. Each bid can be expressed as a function of the advertised product and a task in one or more determined sequences of tasks to purchase the advertised product.

The one or more computing devices can select one or more advertising bids based on the smartphone user's intent to purchase the advertised product, the determined sequence of tasks for purchasing the advertised product, and the smartphone user's task state-Block 470. In such embodiments, notifying the user of the next uncompleted task from the sequence based on the user's current state in the sequence includes presenting the ad(s) of the selected ad bid(s)—Block 450.

In the continuing example, the guided purchasing server 120 receives the bids shown in TABLE 1 from an advertiser system 130. For example, MerchX may submit an advertisement for the Instant Film Mod1 camera with feature set IF-A that focuses on features for the features task, while submitting a broader advertisement for Instant Film Mod1 camera for the Product task.

The one or more computing devices select at least one received advertising bid based on the smartphone user's intent to purchase the advertised product, the smartphone user's task state, and the bid price-Block 420. In such embodiments, notifying the smartphone user comprises transmitting, by the one or more computing devices to the user's smartphone for display, the advertisement of the selected advertising bid-Block 450.

TABLE 1

| Product Intent | Type | Feature Set | Model | Merchant |
|---|---|---|---|---|
| Camera | Instant Film | IF-A | Mod1 | MerchX |
| $0.54 | $0.66 | $0.80 | $0.84 | $0.94 |
| Camera | DLSR | D-A | Mod2 | MerchX |
| $0.54 | $0.65 | $0.76 | $0.84 | $0.99 |
| Camera | SLR | S-A | Mod2S | MerchX |
| $0.54 | $0.65 | $0.74 | $0.85 | $0.99 |
| Camera | DLSR | D-A | Mod2 | MerchY |
| $0.58 | $0.63 | $0.75 | $0.82 | $0.95 |
| Camera | DLSR | D-A | Mod3 | MerchY |
| $0.58 | $0.63 | $0.77 | $0.86 | $0.96 |
| Electric Shaver | Rotating heads | ES-C | Mod4 | MerchY |
| $0.59 | $0.63 | $0.76 | $0.85 | $0.97 |
| Camera | DLSR | D-B | Mod2 | MerchW |
| $0.59 | $0.68 | $0.74 | $0.88 | $0.96 |

In the continuing example, the guided purchasing sever 120 determines, via the smartphone 110, the user's intent to purchase a camera product. The guided purchasing server 120 has previously determined a plurality of sequences, among them S1, for guiding the purchase of a variety of products, including cameras. The guided purchasing server associates S1 with the user's intent to purchase a camera, and determines that the user has not completed any of the tasks in S1. These portions of the process are described above in conjunction with Block 210-Block 240.

The guided purchasing server 120 then notifies the user, via smartphone 110, to select a camera type, as described above in conjunction with Block 250. The guided purchasing server 120 presents one advertisement from each of the top two bidders for the selected product. In this case, the guided purchasing server presents one advertisement from each of MerchW and MerchY for cameras of various types, since MerchW ($0.59) and MerchY ($0.58) have bid the highest for placement of advertisements at this stage of the task sequence for cameras. The guided purchasing server 120 presents information on camera type selection, allowing a user to select, via the smartphone, a hyperlink for content explaining instant film, DSLR, and SLR cameras. The user selects, via smartphone 110, after following the links for content explaining the various camera types, the DSLR type camera. The guided purchasing server updates the user's state to indicate that the first task in S1 has been completed. In the continuing example, each of 1) notification to select a camera type, 2) presentation of each advertisement and the hyperlinks, 3) selection of each hyperlink, and 4) selection of the DSLR camera type, takes place during a separate micro moment, with the smartphone 110 or the guided purchasing server 120 maintaining the user's state.

The guided purchasing server 120 then notifies the user, via smartphone 110, to select a feature set. The guided purchasing server 120 presents one advertisement from each of the top two bidders for feature sets of DSLR type cameras. In this case, the guided purchasing server presents one advertisement from each of MerchX and MerchW for DSLR camera feature sets, since MerchW ($0.68) and MerchX ($0.65) have bid the highest for placement of advertisements at this stage of the task sequence for DSLR cameras. The guided purchasing server 120 presents information on camera feature set selection, allowing a user to select, via the smartphone, a hyperlink for content explaining feature sets D-A and D-B. The user selects, via smartphone 110, after following the links for content explaining the various feature sets, the D-A feature set. The guided purchasing server 120 updates the user's state to indicate that the second task in S1 has been completed. In the continuing example, each of 1) notification to select a feature set, 2) presentation of each advertisement and the hyperlinks, 3) selection of each hyperlink, and 4) selection of the D-A feature set, takes place during a separate micro moment, with the smartphone 110 or the guided purchasing server 120 maintaining the user's state.

The guided purchasing server 120 then notifies the user, via smartphone 110, to select a camera model. The guided purchasing server 120 presents one advertisement from the top two bidders for a DSLR camera having the D-A feature set. In this case, the guided purchasing server presents one advertisement from each of MerchX and MerchY for DSLR camera feature sets, since MerchX ($0.76) and MerchY ($0.77) have bid the highest for placement of advertisements at this stage of the task sequence for DSLR cameras with feature set D-A. The guided purchasing server 120 presents information on camera model selection, allowing a user to select, via the smartphone, a hyperlink for content explaining models Mod2 and Mod3. The user selects, via smartphone 110, after following the links for content explaining the various feature sets, model Mod2. The guided purchasing server 120 updates the users state to indicate that the third task in S1 has been completed. In the continuing example, each of 1) notification to select a model, 2) presentation of each advertisement and the hyperlinks, 3) selection of each hyperlink, and 4) selection of the Mod2 model, takes place during a separate micro moment, with the smartphone 110 or the guided purchasing server 120 maintaining the users state.

The guided purchasing server 120 then notifies the user, via smartphone 110, to select a merchant. The guided purchasing server 120 presents one advertisement from the top bidder for a Mod2 DSLR camera having the D-A feature set. In this case, the guided purchasing server presents one advertisement from MerchX, since MerchX ($0.84) has bid the highest for placement of advertisements at this stage of the task sequence for merchants of Mod2 DSLR cameras with feature set D-A. The guided purchasing server 120 presents information on merchant selection, allowing a user to select, via the smartphone, a hyperlink for content explaining MerchX and MerchY. The user selects, via smartphone 110, after following the links for content explaining the various merchants, merchant MerchY. The guided purchasing server 120 updates the user's state to indicate that the fourth task in S1 has been completed. In the continuing example, each of 1) notification to select a merchant, 2) presentation of each advertisement and the hyperlinks, 3) selection of each hyperlink, and 4) selection of MerchY, takes place during a separate micro moment, with the smartphone 110 or the guided purchasing server 120 maintaining the user's state.

In some embodiments, the guided purchasing server 120 selects at least one advertisement to present to the user, via the smartphone 110, after the user makes her final selection. Such an advertisement can be a "beat that offer" advertisement, for example, the guided purchasing server 120 can select one advertisement based on bid price to present to the user via smartphone 110. In this case, MerchW's post selection bid ($0.99) is the highest, and the guided purchasing server 120 presents MerchW's post selection advertisement to the user via smartphone 100.

While the guided purchasing server 120 has been described herein as presenting advertisements bounded by the user's selections for simplicity of explanation, the guided purchasing server 120 can present data for those products that meet the current user selections, and present advertisements for a broader, or merely different, range of products. For example, a user interested in a Mod2 DSLR camera may fit the intended audience for an advertisement from a nearby photography school. While a list of Mod2 DSLR cameras available for sale may be presented to the user, an advertisement for the photography school may be selected by the guided purchasing server 120 for presentation to the user via the smartphone 110.

In some embodiments, the guided purchasing server 120 can charge advertisers based on user interaction with ad content and interaction with notifications. In addition, the guided purchasing server can receive an advertiser bid on, and award advertising opportunities based on, the duration of each task, and the frequency with which the notifications are sent to the user. In some embodiments, advertisers can bid to add tasks to a determined task sequence, and the guided purchasing server 120 can conduct an auction awarding added tasks to one or more advertisers. In some embodiments, overall user value and value to the guided purchasing server 120 operator are considered when awarding advertising opportunities. In some embodiments, the advertiser is charged based on the action user takes on the content recommended by advertiser and based on the decision user makes. For example, MerchX may bid for DSLR choice while MerchY may bid on Point and shoot as each merchant may have strengths in those areas. The merchants also can bid individually on content they are sharing with users. If a user selects any of the content, the advertiser is charged for that action and if user makes a choice to go with DSLR, all merchants that are bidding on that choice can be charged. This can incentivize advertisers to bid high on early decisions where their strength lies.

Other Example Embodiments

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 7:
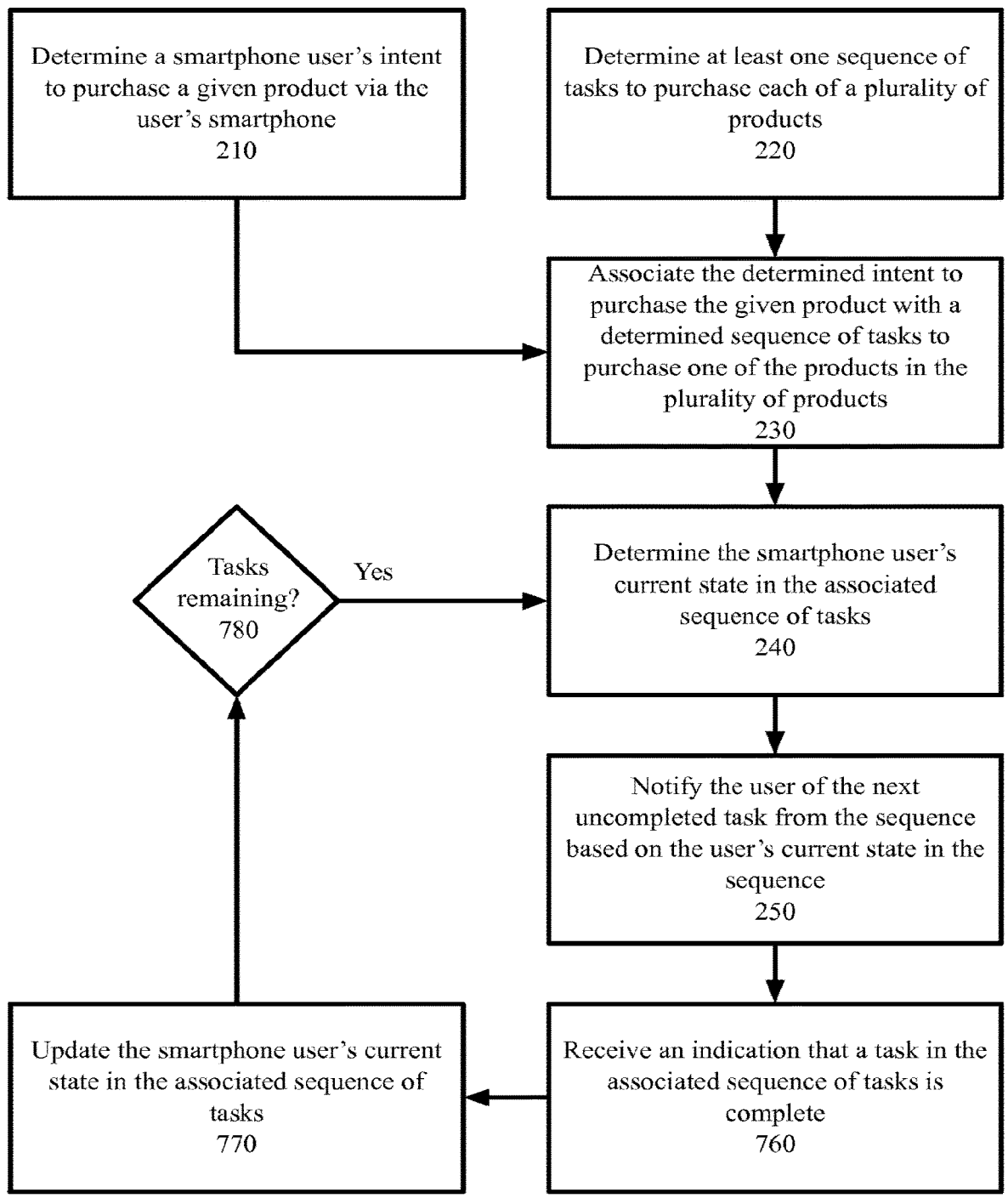
FIG. 7 is a block diagram depicting guiding purchase activities using a smartphone, in accordance with certain example embodiments.
Figure 8:
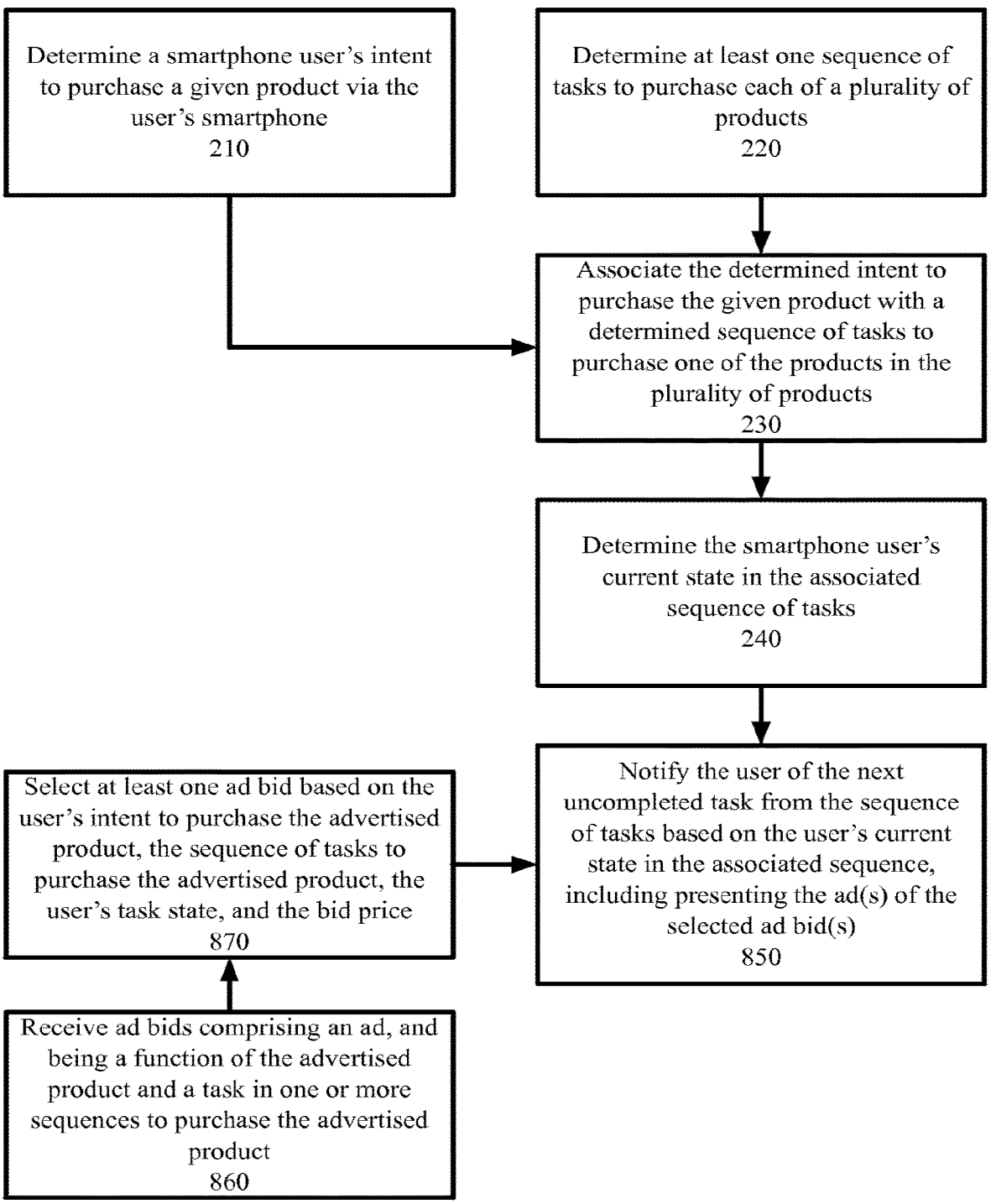
FIG. 8 is a block diagram depicting guiding purchase activities using a smartphone in accordance with certain example embodiments.
Figure 9:
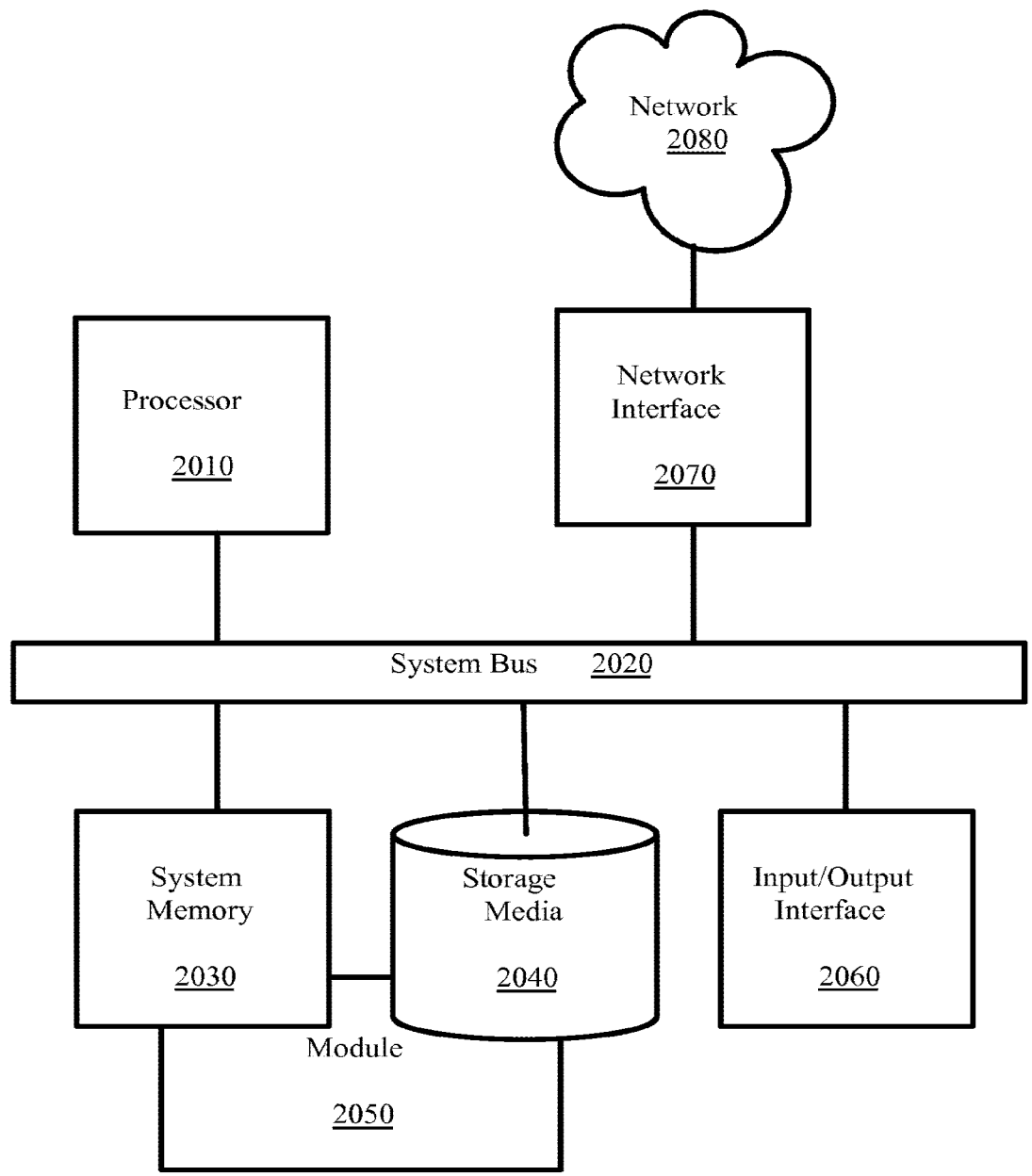
FIG. 9 is a diagram depicting a computing machine and a module, in accordance with certain example embodiments of the disclosed technology.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein. For example, in embodiments described by FIG. 7, decryption, by the POS device 120, of received authorization information can occur before receiving verification information (v) from a user device 130.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The invention claimed is:

1. A computer-implemented method to guide purchasing via a user device, comprising:
   determining, by a computing system, a sequence of tasks to purchase a product based on post-purchase consumer satisfaction information, wherein the sequence of tasks comprises at least a sequence of a first task, a second task, and a last task associated with the product;
   receiving, by the computing system, an indication that a user device has performed the first task associated with the product;
   receiving, by the computing system, an indication that the user device has performed the second task associated with the product after performing the first task associated with the product;
   based at least on receiving the indications that the user device performed the first task and the second task, determining an intent to purchase the product;

determining, by the computing system, that the user device has not performed the last task associated with the product; and based at least on determining the intent to purchase the product and that the user device has not performed the last task, presenting, by the computing system via the user device, a notification indicating the last task from the sequence of tasks along with instructions for completing the last task.

2. The computer-implemented method of claim 1,
wherein the first task comprises selection of a product type; and
wherein the second task comprises selection of one or more features associated with the product type.

3. The computer-implemented method of claim 1, wherein the sequence of tasks comprises at least a sequence of the first task, the second task, a third task, and the last task associated with the product, the method further comprising:
receiving, by the computing system, an indication that the user device has performed the third task associated with the product after performing the second task associated with the product,
wherein determining the intent to purchase the product is further based on receiving the indication that the user device performed the third task.

4. The computer-implemented method of claim 3,
wherein the first task comprises selection of a product type;
wherein the second task comprises selection of one or more features associated with the product type; and
wherein the third task comprises selection of a product model of the selected product type having one or more features associated with the product type.

5. The computer-implemented method of claim 4, wherein the sequence of tasks further comprises a fourth task associated with the product, the method further comprising:
receiving, by the computing system, an indication that the user device has performed the fourth task associated with the product after performing the third task associated with the product, wherein the fourth task comprises selection of a merchant that carries the selected product model.

6. The computer-implemented method of claim 1, further comprising:
prior to determining that the user device has not performed the last task associated with the product, identifying, by the computing system, a next uncompleted task from the sequence of tasks; and
presenting, by the computing system via the user device, a notification indicating the next uncompleted task from the sequence of tasks along with instructions for completing the next uncompleted task.

7. The computer-implemented method of claim 1, further comprising:
prior to determining that the user device has not performed the last task associated with the product, identifying, by the computing system, two or more uncompleted tasks from the sequence of tasks; and
presenting, by the computing system via the user device, a notification indicating the two or more uncompleted tasks from the sequence of tasks.

8. The computer-implemented method of claim 1, wherein the sequence of tasks comprises: (i) a task for choosing a product type, (ii) a task for choosing one or more product features, (iii) a task for choosing a product model, and (iv) a task for choosing a merchant.

9. The computer-implemented method of claim 1, wherein each task in the sequence of tasks is identified by the computing system as tasks that can be completed via a mobile computing device within a specified period of time.

10. A computer program product, comprising:
a non-transitory computer-readable storage medium having computer-executable program instructions embodied thereon that when executed by one or more processors cause the one or more processors to perform operations comprising:
determining, by a computing system, a sequence of tasks to purchase a product based on post-purchase consumer satisfaction information, wherein the sequence of tasks comprises at least a sequence of a first task, a second task, and a last task associated with the product;
receiving an indication that a user device has performed the first task associated with the product;
receiving an indication that the user device has performed the second task associated with the product after performing the first task associated with the product;
based at least on receiving the indications that the user device performed the first task and the second task, determining an intent to purchase the product;
determining that the user device has not performed the last task associated with the product; and
based at least on determining the intent to purchase the product and that the user device has not performed the last task, presenting, via the user device, a notification indicating the last task from the sequence of tasks along with instructions for completing the last task.

11. The computer program product of claim 10,
wherein the first task comprises selection of a product type; and
wherein the second task comprises selection of one or more features associated with the product type.

12. The computer program product of claim 10, wherein the sequence of tasks comprises at least a sequence of the first task, the second task, a third task, and the last task associated with the product, the operations further comprising:
receiving, by the computing system, an indication that the user device has performed the third task associated with the product after performing the second task associated with the product,
wherein determining the intent to purchase the product is further based on receiving the indication that the user device performed the third task.

13. The computer program product of claim 12,
wherein the first task comprises selection of a product type;
wherein the second task comprises selection of one or more features associated with the product type; and
wherein the third task comprises selection of a product model of the selected product type having one or more features associated with the product type.

14. The computer program product of claim 13, wherein the sequence of tasks further comprises a fourth task associated with the product, the operations further comprising:
receiving, by the computing system, an indication that the user device has performed the fourth task associated with the product after performing the third task associated with the product, wherein the fourth task comprises selection of a merchant that carries the selected product model.

15. The computer program product of claim 10, the operations further comprising:
- prior to determining that the user device has not performed the last task associated with the product, identifying, by the computing system, a next uncompleted task from the sequence of tasks; and
- presenting, by the computing system via the user device, a notification indicating the next uncompleted task from the sequence of tasks along with instructions for completing the next uncompleted task.

16. The computer program product of claim 10, the operations further comprising:
- prior to determining that the user device has not performed the last task associated with the product, identifying, by the computing system, two or more uncompleted tasks from the sequence of tasks; and
- presenting, by the computing system via the user device, a notification indicating the two or more uncompleted tasks from the sequence of tasks.

17. The computer program product of claim 10, wherein the sequence of tasks comprises: (i) a task for choosing a product type, (ii) a task for choosing one or more product features, (iii) a task for choosing a product model, and (iv) a task for choosing a merchant.

18. The computer program product of claim 10, wherein each task in the sequence of tasks is identified by the computing system as tasks that can be completed via a mobile computing device within a specified period of time.

19. A computing system comprising:
- one or more processors; and
- computer readable storage containing instructions that, when executed by the one or more processors, cause the computing system to perform operations comprising:
  - determining a sequence of tasks to purchase a product based on post-purchase consumer satisfaction information, wherein the sequence of tasks comprises at least a sequence of a first task, a second task, and a last task associated with the product;
  - receiving an indication that a user device has performed the first task associated with the product;
  - receiving an indication that the user device has performed the second task associated with the product after performing the first task associated with the product;
  - based at least on receiving the indications that the user device performed the first task and the second task, determining an intent to purchase the product;
  - determining that the user device has not performed the last task associated with the product; and
  - based at least on determining the intent to purchase the product and that the user device has not performed the last task, presenting, via the user device, a notification indicating the last task from the sequence of tasks along with instructions for completing the last task.

20. The computer system of claim 19, the operations further comprising:
- prior to determining that the user device has not performed the last task associated with the product, identifying, by the computing system, a next uncompleted task from the sequence of tasks; and
- presenting, by the computing system via the user device, a notification indicating the next uncompleted task from the sequence of tasks along with instructions for completing the next uncompleted task.

* * * * *